(12) United States Patent
Lee et al.

(10) Patent No.: US 12,463,261 B2
(45) Date of Patent: Nov. 4, 2025

(54) BATTERY PACK HAVING STRUCTURE WITH INCREASED EASE OF MOVEMENT AND ASSEMBLY, AND STRUCTURE WITH IMPROVED SAFETY

(71) Applicant: LG ENERGY SOLUTION, LTD., Seoul (KR)

(72) Inventors: Jae-Ki Lee, Daejeon (KR); Jae-Hong Kim, Daejeon (KR); Bum-Hyun Lee, Daejeon (KR); Eung-Gyu Lee, Daejeon (KR); Jae-Bum Lim, Daejeon (KR); Yeo-Joo Choi, Daejeon (KR)

(73) Assignees: LG ENERGY SOLUTIONS, LTD., Seoul (KR); OMRON CORPORATION, Kyoto (JP)

( * ) Notice: Subject to any disclaimer, the term of this patent is extended or adjusted under 35 U.S.C. 154(b) by 551 days.

(21) Appl. No.: 17/772,953

(22) PCT Filed: Mar. 4, 2021

(86) PCT No.: PCT/KR2021/002704
§ 371 (c)(1),
(2) Date: Apr. 28, 2022

(87) PCT Pub. No.: WO2021/177756
PCT Pub. Date: Sep. 10, 2021

(65) Prior Publication Data
US 2024/0162506 A1   May 16, 2024

(30) Foreign Application Priority Data
Mar. 5, 2020 (KR) .................. 10-2020-0027900

(51) Int. Cl.
*H01M 10/42* (2006.01)
*H01M 50/209* (2021.01)
(Continued)

(52) U.S. Cl.
CPC ..... *H01M 10/4257* (2013.01); *H01M 50/209* (2021.01); *H01M 50/244* (2021.01);
(Continued)

(58) Field of Classification Search
None
See application file for complete search history.

(56) References Cited

U.S. PATENT DOCUMENTS

2009/0092891 A1   4/2009 Kwag et al.
2009/0317703 A1   12/2009 Kwag et al.
(Continued)

FOREIGN PATENT DOCUMENTS

| CN | 202695647 U | 1/2013 |
|---|---|---|
| CN | 107851750 A | 3/2018 |

(Continued)

OTHER PUBLICATIONS

Extended European Search Report for European Application No. 21763556.4, dated Jun. 6, 2023.
(Continued)

*Primary Examiner* — Alix E Eggerding
(74) *Attorney, Agent, or Firm* — Birch, Stewart, Kolasch & Birch, LLP (57) ABSTRACT

A battery pack includes a pair of battery modules having at least one pair of first grip grooves and at least one connector formed at a top thereof, a supporting plate coupled to a bottom of the pair of battery modules and fixed to the ground and a BMS assembly having a guide protrusion inserted into the first grip groove and coupled to the pair of battery modules in a plug-in type by means of the connector.

17 Claims, 9 Drawing Sheets

(51) Int. Cl.
*H01M 50/244* (2021.01)
*H01M 50/247* (2021.01)
*H01M 50/256* (2021.01)
*H01M 50/284* (2021.01)
*H01M 50/35* (2021.01)
*H01M 50/514* (2021.01)
*H01M 50/583* (2021.01)

(52) U.S. Cl.
CPC ....... *H01M 50/247* (2021.01); *H01M 50/256* (2021.01); *H01M 50/284* (2021.01); *H01M 50/35* (2021.01); *H01M 50/514* (2021.01); *H01M 50/583* (2021.01); *H01M 2200/103* (2013.01); *H01M 2220/30* (2013.01)

(56) References Cited

U.S. PATENT DOCUMENTS

| | | | |
|---|---|---|---|
| 2011/0039134 A1* | 2/2011 | Kim | H01M 10/637 429/7 |
| 2012/0301747 A1* | 11/2012 | Han | H01M 50/256 429/7 |
| 2012/0328908 A1* | 12/2012 | Han | H01M 50/519 429/7 |
| 2013/0101883 A1 | 4/2013 | Zhao | |
| 2013/0330588 A1 | 12/2013 | Ahn et al. | |
| 2018/0062145 A1 | 3/2018 | Yang | |
| 2018/0175342 A1 | 6/2018 | Kim et al. | |
| 2019/0036091 A1 | 1/2019 | Lee et al. | |
| 2019/0207277 A1 | 7/2019 | Les et al. | |
| 2020/0194843 A1 | 6/2020 | Kwon et al. | |
| 2020/0287184 A1* | 9/2020 | Pevear | H01M 10/0525 |
| 2023/0083113 A1* | 3/2023 | Lee | H01M 10/425 429/7 |

FOREIGN PATENT DOCUMENTS

| | | |
|---|---|---|
| CN | 109314288 A | 2/2019 |
| CN | 208939023 U | 6/2019 |
| CN | 110571486 A | 12/2019 |
| CN | 110710025 A | 1/2020 |
| CN | 210040454 U | 2/2020 |
| EP | 3 297 061 A1 | 3/2018 |
| JP | 3209217 U | 3/2017 |
| JP | 2019-169337 A | 10/2019 |
| KR | 10-0876267 B1 | 12/2008 |
| KR | 10-2009-0132490 A | 12/2009 |
| KR | 10-2013-0017110 A | 2/2013 |
| KR | 10-2014-0068833 A | 6/2014 |
| KR | 10-2017-0082248 A | 7/2017 |
| KR | 10-2017-0095070 A | 8/2017 |
| KR | 10-2017-0137316 A | 12/2017 |
| KR | 10-1817238 B1 | 1/2018 |
| KR | 10-1932648 B1 | 12/2018 |

OTHER PUBLICATIONS

International Search Report for PCT/KR2021/002704 (PCT/ISA/210) mailed on Jun. 17, 2021.

* cited by examiner

BATTERY PACK HAVING STRUCTURE WITH INCREASED EASE OF MOVEMENT AND ASSEMBLY, AND STRUCTURE WITH IMPROVED SAFETY

TECHNICAL FIELD

The present disclosure relates to a battery pack having a structure with improved convenience for carrying and assembling and improved safety, and more particularly, to a battery pack having a structure for fastening a plurality of battery modules by using a module fastening plate and a BMS assembly and a structure for preventing a flame generated at a battery cell provided therein from being leaked out of the battery pack.

The present application claims priority to Korean Patent Application No. 10-2020-0027900 filed on Mar. 5, 2020 in the Republic of Korea, the disclosures of which are incorporated herein by reference.

BACKGROUND ART

A battery pack used as an energy storage system is a kind of energy storage system configured to remove the risk caused by external physical factors during use and to function properly in consideration of the installation environment and use conditions. The battery pack used as an energy storage system may have a form in which a plurality of battery modules and a BMS assembly electrically connected to the battery modules are coupled.

Among various kinds of battery packs used as an energy storage system, in particular, a battery pack for home use is often necessary to move through narrow stairs and/or passages. The battery pack used as an energy storage system has a relatively large volume and a relatively heavy weight in many cases, so the battery pack should be made in consideration of the convenience for carrying and installation. In addition, since the battery pack used as an energy storage system includes a plurality of battery cells to ensure sufficient capacity and output, the battery pack needs to be designed to secure user safety in case an abnormal situation occurs during use.

DISCLOSURE

Technical Problem

The present disclosure is designed to solve the problems of the related art, and therefore the present disclosure is directed to providing a battery pack having a structure with improved convenience for carrying and installation and improved safety during use.

However, the technical problem to be solved by the present disclosure is not limited to the above, and other objects not mentioned herein will be understood from the following description by those skilled in the art.

Technical Solution

In one aspect of the present disclosure, there is provided a battery pack, comprising: a pair of battery modules having at least one pair of first grip grooves and at least one connector formed at a top of the pair of battery modules; a supporting plate coupled to a bottom of the pair of battery modules and fixed to the ground; and a Battery Management System (BMS) assembly having a guide protrusion inserted into the at least one pair of first grip grooves and coupled to the pair of battery modules by the connector.

Each battery module of the pair of battery modules may include a cell stack having a plurality of battery cells; a module housing configured to accommodate the cell stack; a lower cover configured to cover a bottom opening of the module housing; and an upper cover assembly configured to cover a top opening of the module housing.

The upper cover assembly may include an upper cover configured to cover the top opening of the module housing so that the connector is formed at one longitudinal side thereof, the upper cover having an upper cover groove formed at a center of the upper cover to be concave downward; a fuse fixed in the upper cover groove and electrically connected to the battery cell; a fuse cover configured to cover the fuse inside the upper cover groove; and a cover plate configured to cover a top of the upper cover groove and coupled to the upper cover.

The cover plate may have at least one pair of cover plate holes and be formed to be spaced apart from the fuse cover so that the at least one pair of first grip grooves is formed between the cover plate and the fuse cover.

The BMS assembly may include a BMS body coupled to the pair of battery modules; and a BMS cover coupled to an upper portion of the BMS body.

The battery pack may have second grip grooves formed between a longitudinal side of the BMS cover and a longitudinal side of and the BMS body.

The guide protrusion may be formed at a lower surface of the BMS body and inserted into the at least one pair of first grip grooves through the cover plate hole to guide coupling between the BMS assembly and the battery module.

The battery pack may further comprise a gasket interposed between the guide protrusion and an inner surface of the cover plate hole.

A gas channel may be formed between the cell stack and the module housing.

The lower cover may have lower cover holes formed at longitudinal sides thereof to communicate with the gas channel.

A mesh filter may be inserted into the lower cover holes.

The lower cover may include a plurality of first barriers configured to extend downward.

The supporting plate may include a plurality of second barriers formed to extend upward; and a gas discharge hole formed at a longitudinal center thereof.

The plurality of first barriers and the plurality of second barriers formed at positions corresponding to each other may be configured to intersect each other.

Advantageous Effects

According to an embodiment of the present disclosure, it is possible to provide a battery pack having a structure with improved convenience for carrying and installation and improved safety during use.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a schematic structure of a battery pack 1 according to an embodiment of the present disclosure and a coupling relationship between respective components thereof will be described with reference to FIGS. 1 and 2.

Figure 1:
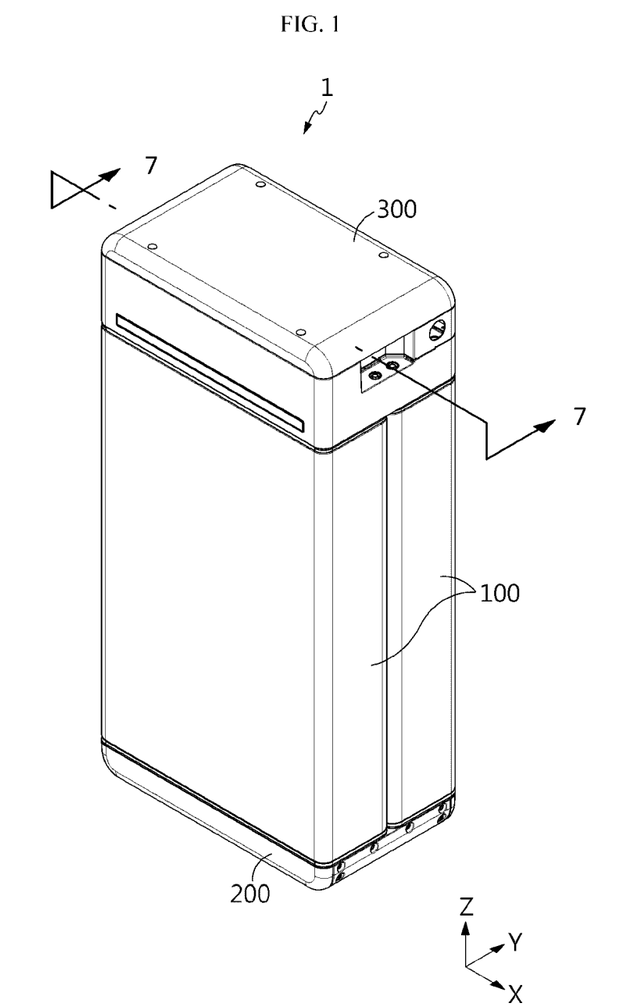
FIG. 1 is a perspective view of a battery pack according to an embodiment of the present disclosure in an assembled state.
Figure 2:
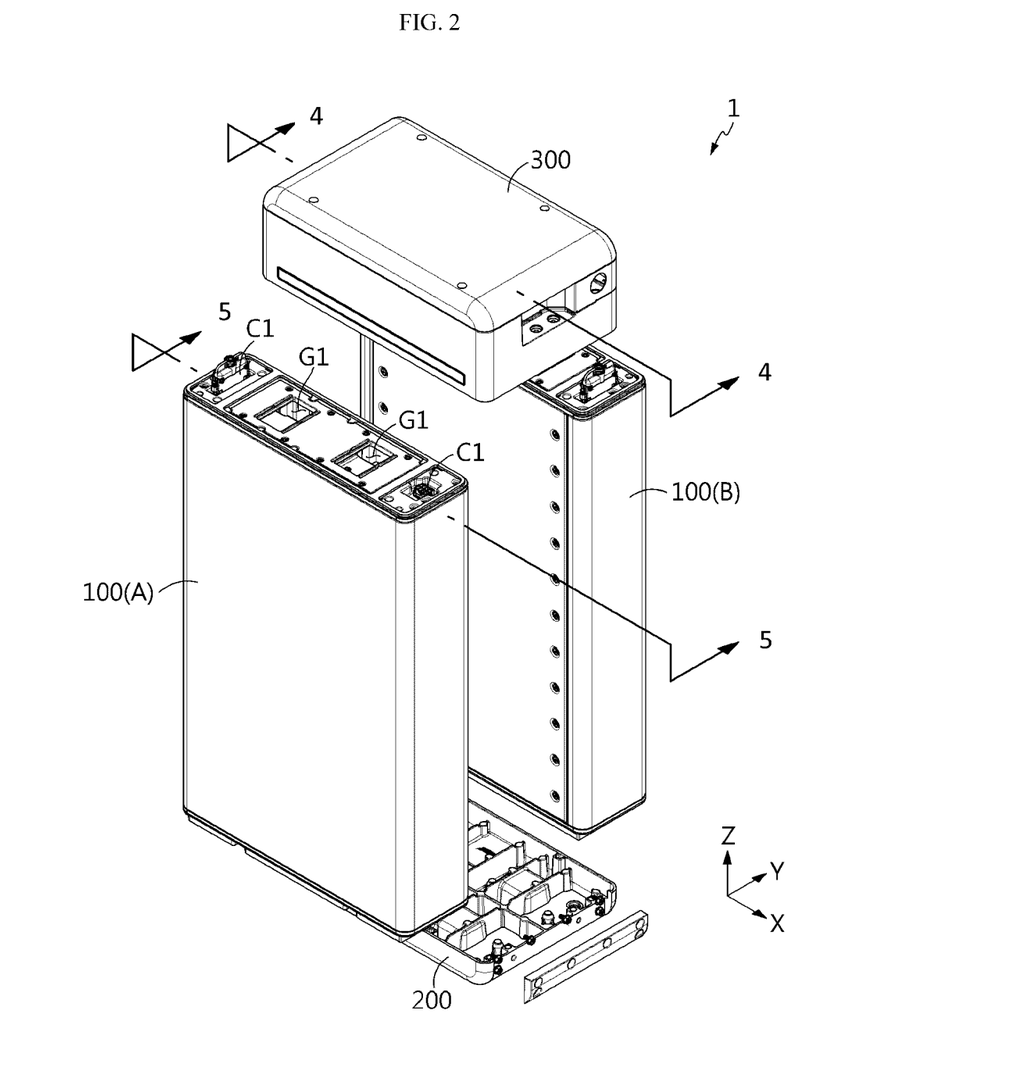
FIG. 2 is an exploded perspective view showing the battery pack of FIG. 1.

Referring to FIGS. 1 and 2, the battery pack 1 according to an embodiment of the present disclosure includes a plurality of battery modules 100, a supporting plate 200, and a BMS assembly 300. The battery pack 1 may be, for example, an energy storage system (ESS) battery pack for energy storage.

A bottom of the battery module 100 is inserted/fixed to the supporting plate 200, and the BMS assembly 300 is coupled to a top of the battery module 100.

The supporting plate 200 may be fixed to the ground, thereby functioning as a bracket for fixing the plurality of battery modules 100. Here, the ground means a floor surface of the place where the battery pack 1 is used for energy storage.

The BMS assembly 300 includes at least one BMS (Battery Management System), and the BMS assembly 300 may be coupled to the top of the plurality of battery modules 100 in a plug-in type to mechanically fasten the plurality of battery modules 100 to each other and control charging and discharging for the plurality of battery modules 100. In addition, the BMS assembly 300 may enable electrical connection among the plurality of battery modules 100.

The battery module 100 and the BMS assembly 300 may be coupled by combining a first connector C1 provided at an upper surface of the battery module 100 and a second connector C2 (see FIG. 7) provided at a lower surface of the BMS assembly 300. In addition, a plurality of first grip grooves G1 may be formed in the upper surface of the battery module 100, and a plurality of guide protrusions 311 (see FIG. 8) provided in a shape and number corresponding to the plurality of first grip grooves G1 and inserted into the first grip grooves G1 may be formed at the lower surface of the BMS assembly 300 to guide the coupling between the battery module 100 and the BMS assembly 300.

Next, a detailed structure of the battery module 100 will be described with reference to FIGS. 3 and 4.

Figure 3:
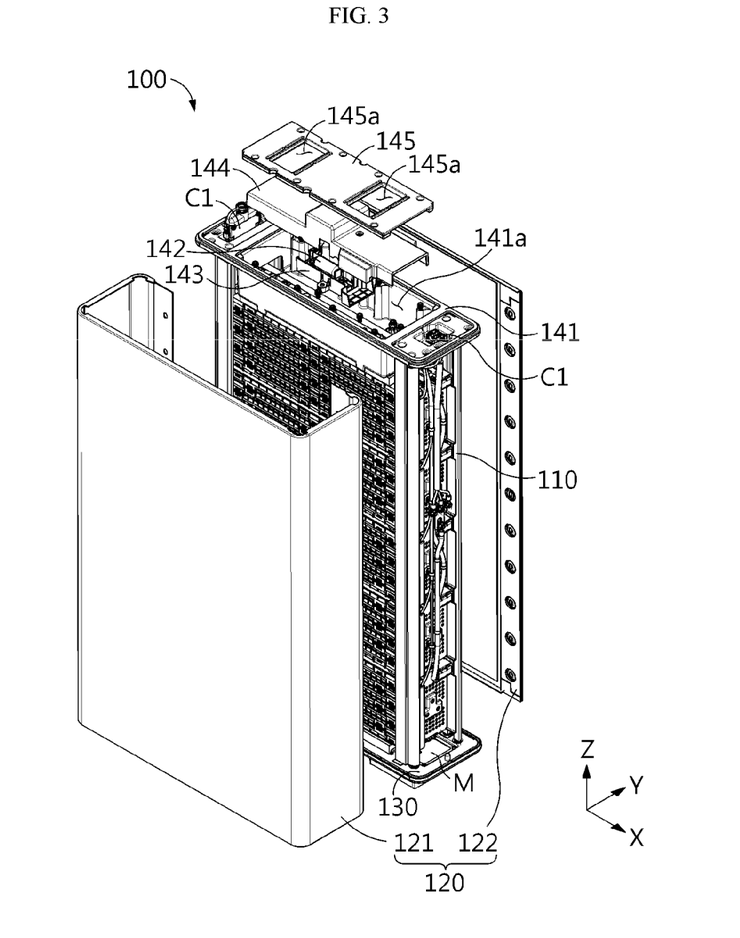
FIG. 3 is an exploded perspective view showing a battery module applied to the present disclosure.
Figure 4:
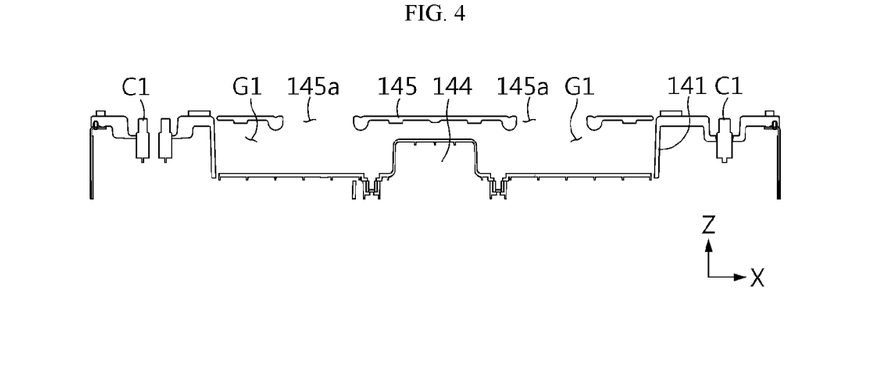
FIG. 4 is a sectional view, taken along the line 4-4 of FIG. 2.

Referring to FIGS. 3 and 4, the battery module 100 includes a cell stack 110, a module housing 120, a lower cover 130, and an upper cover assembly 140.

The cell stack 110 may include a plurality of battery cells electrically connected to each other, and may include additional components for mechanically coupling and/or electrically coupling the plurality of battery cells. As the battery cell used to configure the cell stack 110, for example, a pouch-type battery cell may be applied.

The module housing 120 has an approximately rectangular parallelepiped shape with openings formed at the top and bottom thereof, respectively, and accommodates the cell stack 110 in the inner space thereof. The module housing 120 may have a form in which a front plate 121 and a rear plate 122 are combined. However, the structure of the module housing 120 is not limited thereto, and the module housing 120 may have an integrated structure, rather than a structure in which a plurality of pieces are combined, and alternatively, may have a form in which three or more pieces are combined.

The lower cover 130 covers the bottom opening of the module housing 120 and supports the cell stack 110. The lower cover 130 has a special structure to induce gas to be discharged downward when internal gas and flame are generated due to abnormality of the battery pack 1 and also to minimize the external emission of the flame. This structure will be described later in detail with reference to FIGS. 10 and 11, along with the specific structure of the supporting plate 200.

The upper cover assembly 140 covers the top opening of the module housing 120, and secures the airtightness of the top opening of the module housing 120 so that the gas and flame generated due to abnormality of the battery pack 1 are not discharged upward.

The upper cover assembly 140 may include an upper cover 141, a fuse 142, a fuse holder 143, a fuse cover 144, and a cover plate 145.

The upper cover 141 covers the top opening of the module housing 120 and has a first connector C1 formed at one side thereof in a longitudinal direction (a direction parallel to the X axis in FIG. 3). In addition, the upper cover 141 has an upper cover groove 141a formed at the center thereof to be concave downward. The upper cover groove 141a communicates with the accommodating space in the module housing 120 for accommodating the cell stack 110 through a hole formed in the upper cover 141. This is for electrical connection between the cell stack 110 accommodated in the module housing 120 and the fuse 142 installed in the cover groove 141a.

The fuse holder 143 is fixed in the upper cover groove 141a and fixes the fuse 142. However, in the present disclosure, the fuse holder 143 may be excluded, and in this case, the fuse 142 may be directly fixed to an inner surface of the upper cover groove 141*a* by using an adhesive member or be fixed using a fixing structure integrally formed with the upper cover 141 inside the upper cover groove 141*a*.

The fuse cover 144 has a length and width corresponding to the upper cover groove 141*a*, and covers the fuse 142 and the fuse holder 143 inside the upper cover groove 141*a*.

The cover plate 145 covers the top of the upper cover groove 141*a*, and is coupled to the upper cover 141. The cover plate 145 has at least one pair of cover plate holes 145*a*, and is installed to be spaced apart from the fuse cover 144 so that a first grip groove G1 is formed between the cover plate 145 and the fuse cover 144. The cover plate hole 145*a* and the first grip groove G1 provide a space for a worker to grip the battery module 100 by inserting a finger or a gripping device when transporting the battery module 100, thereby giving convenience in transporting the battery module 100. In addition, the cover plate hole 145*a* and the first grip groove G1 provide an insertion space for the guide protrusion 311 (see FIG. 8) provided on the BMS assembly 300 as described above in addition to the above function, thereby guiding the coupling between the BMS assembly 300 and the battery module 100.

Figure 6:
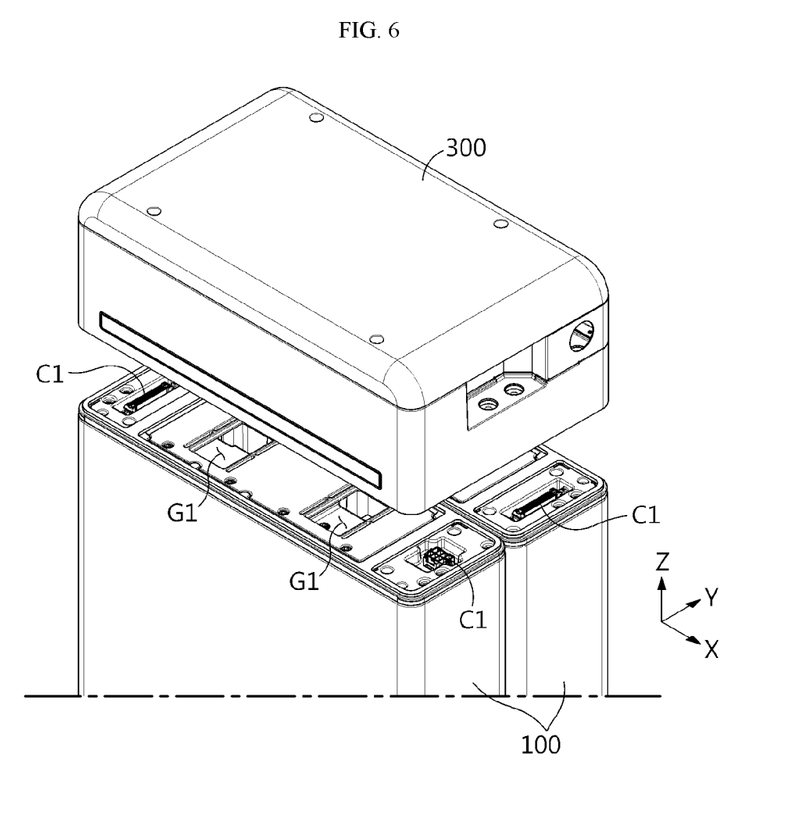
FIG. 6 is a diagram showing a coupling relationship between a pair of battery modules and a BMS assembly applied to the present disclosure.
Figure 7:
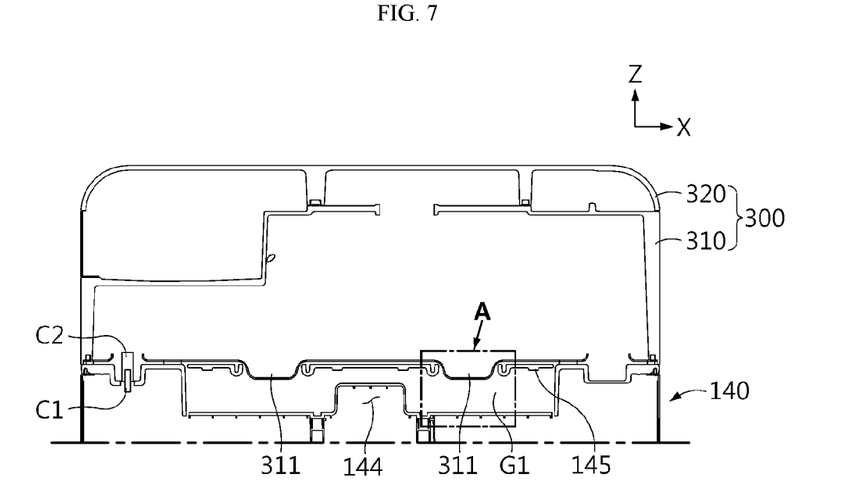
FIG. 7 is a sectional view, taken along the line 7-7 of FIG. 1.
Figure 8:
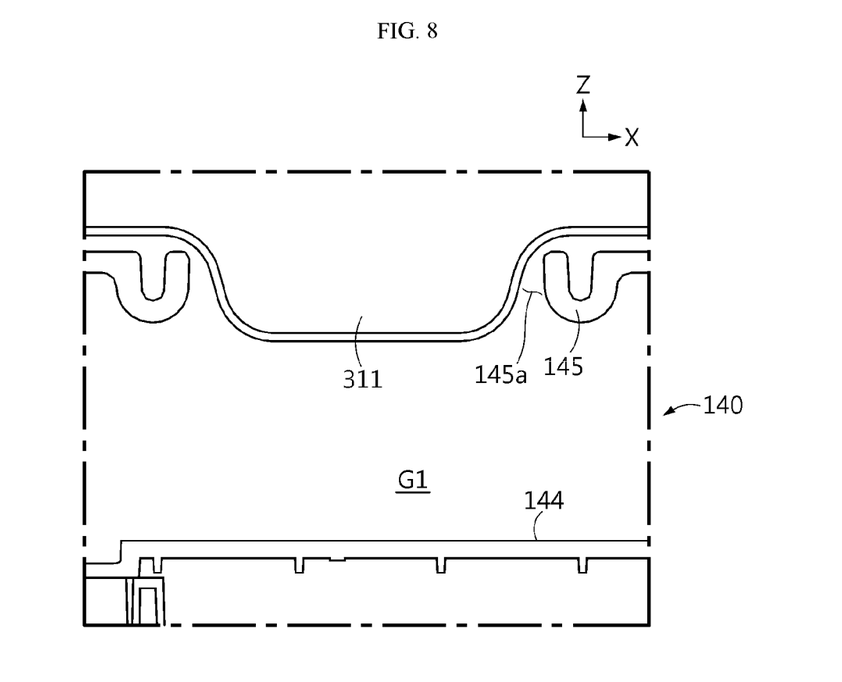
FIGS. 8 and 9 are enlarged views showing a region A of FIG. 7.

That is, as shown in FIGS. 6 to 8, in the coupling between the battery module 100 and the BMS assembly 300, if the guide protrusion 311 (see FIG. 8) and the cover plate hole 145*a* are aligned and coupled, the first connector C1 of the battery module 100 naturally and the second connector C2 of the BMS assembly 300 are naturally coupled.

Figure 10:
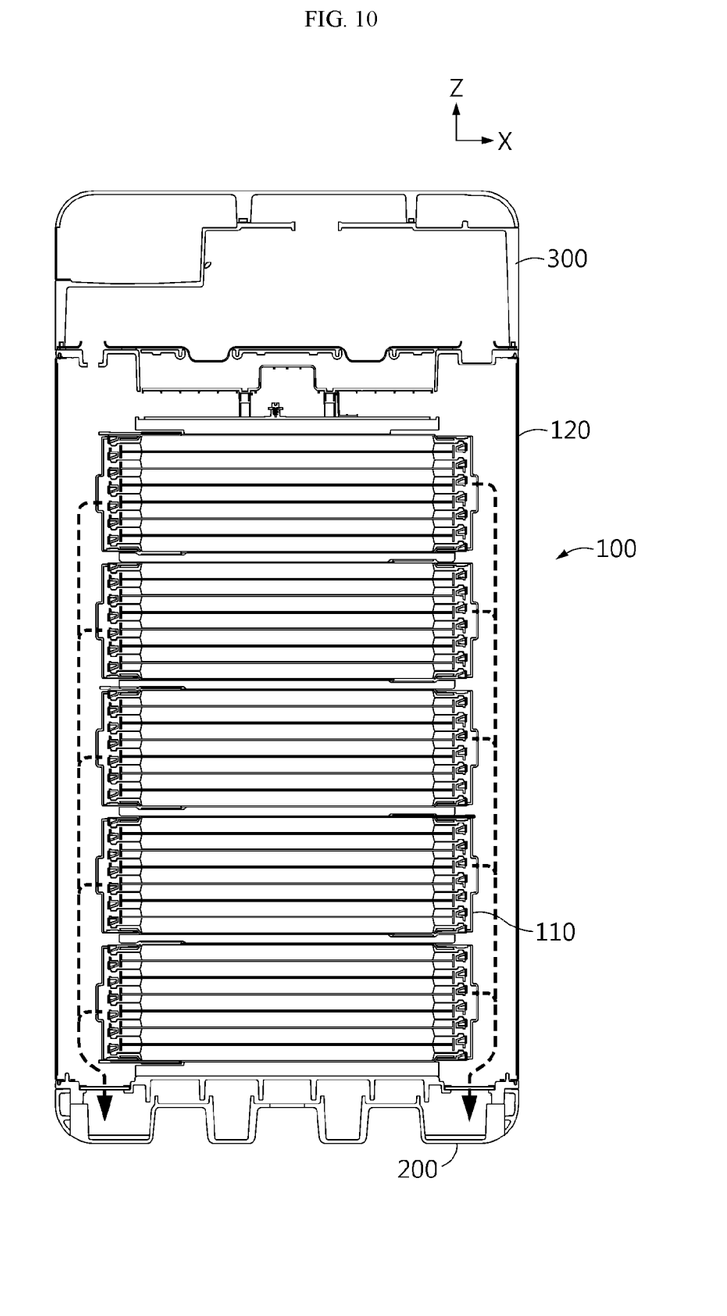
FIG. 10 is a diagram showing a movement path of flame and gas generated inside the battery module.

Meanwhile, referring to FIGS. 8 and 10, the guide protrusion 311 has a size and shape corresponding to the cover plate hole 145*a*, thereby preventing the gas and/or flame generated from the cell stack 110 located at a lower portion of the upper cover assembly 140 from being leaked toward the BMS assembly 300 through the upper portion of the battery module 100.

Figure 9:
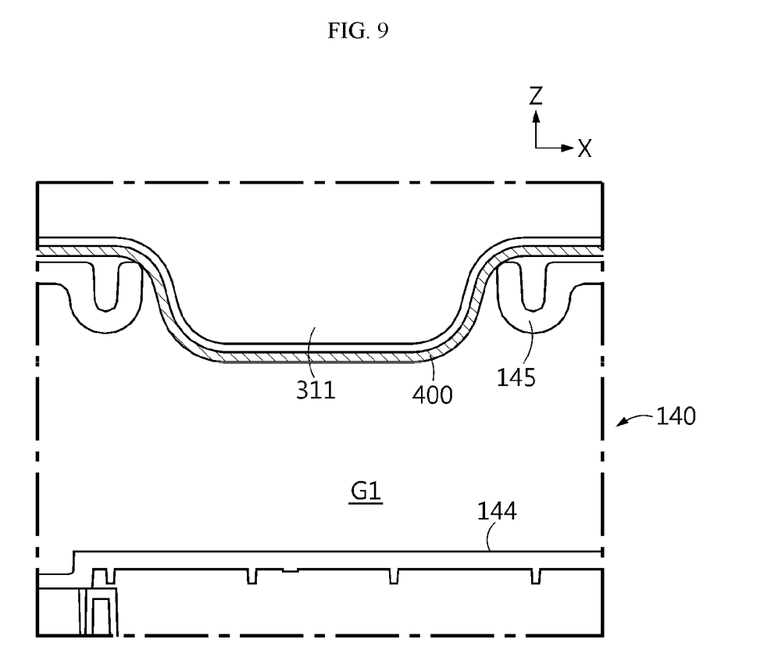

Also, referring to FIGS. 9 and 10, a gasket 400 may be interposed between the guide protrusion 311 and the inner surface of the cover plate hole 145*a*. This is to further increase airtightness in order to more reliably prevent the gas and/or flame generated from the cell stack 110 from being leaked toward the BMS assembly 300 through the upper portion of the battery module 100.

Figure 5:
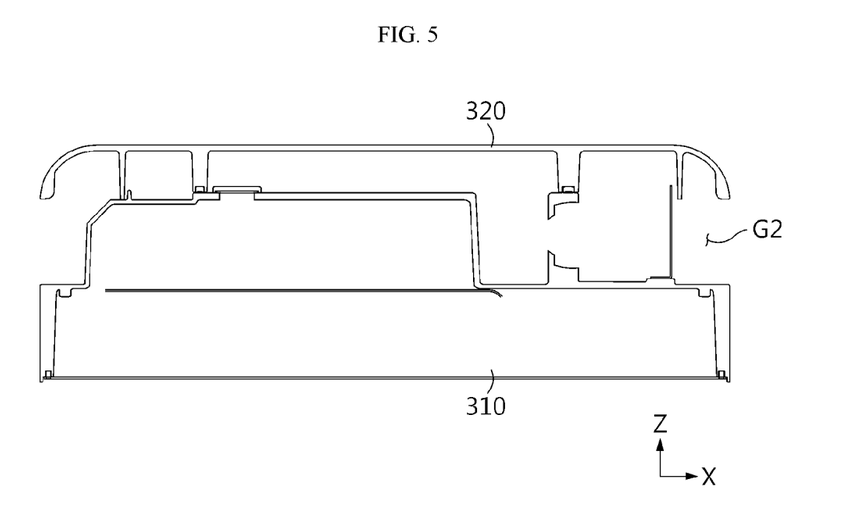
FIG. 5 is a sectional view, taken along the line 5-5 of FIG. 2.

Referring to FIGS. 5 to 7, the BMS assembly 300 includes a BMS body 310 and a BMS cover 320.

The BMS body 310 includes at least one BMS, and has at least two second connectors C2 provided at a lower surface thereof and electrically connected to the BMS. Each second connector C2 is coupled with the first connector C1 provided on the top of the plurality of battery modules 100 in one-to-one relationship, and thus each battery module 100 is electrically connected to the BMS. In addition, depending on the circuit configuration of the BMS, the battery modules 100 may be electrically connected to each other in series and/or in parallel.

The BMS cover 320 is coupled to the upper portion of the BMS body 310. The BMS cover 320 may function as a handle of the BMS assembly 300. That is, one side and the other side of the BMS cover 320 in the longitudinal direction (a direction parallel to the X axis in FIG. 5) and the upper surface of the BMS body 310 are spaced apart from each other by a predetermined distance, and accordingly, second grip grooves G2 are formed at both longitudinal sides of the BMS cover 320, respectively. The second grip groove G2 gives a space for a worker to insert a finger or a gripping device to move the BMS assembly 300 and/or transport the battery pack 1.

Next, a specific structure of the bottom of the battery module 100 and a specific structure of the supporting plate 200 will be described with reference to FIGS. 10 and 11.

A structure capable of smoothly discharging the gas generated from the cell stack 110 to the outside and preventing the flame from being discharged to the outside is formed at the bottom of the battery module 100.

Figure 11:
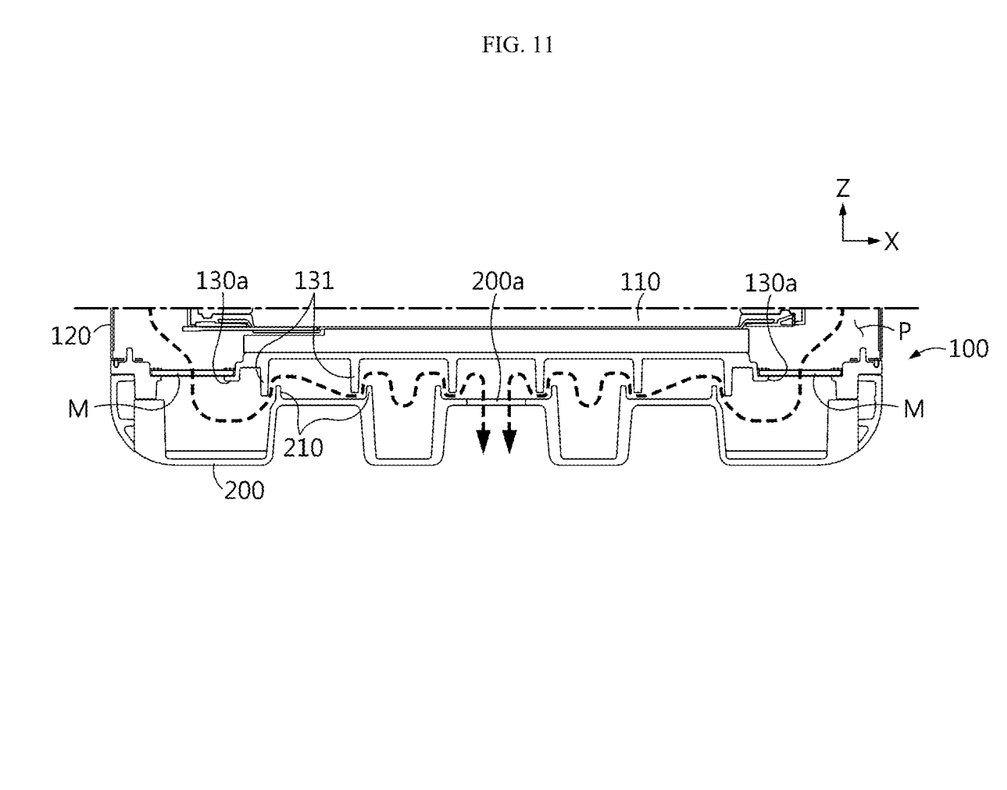
FIG. 11 is a sectional view, taken along the line 7-7 of FIG. 1, which shows a detailed structure of a coupling region between the battery module and a supporting plate.

The lower cover 130 includes a pair of lower cover holes 130*a*, a pair of mesh filters M, and a plurality of first barriers 131 formed at both sides thereof in the longitudinal direction (a direction parallel to the X axis in FIG. 11). The lower cover hole 130*a* communicates with a gas channel P formed between the cell stack 110 and the module housing 120. Accordingly, the gas and/or flame generated from the cell stack 110 may be discharged downward (in a direction parallel to the Z axis of FIG. 11) through the lower cover hole 130*a*. The mesh filter M is inserted/fixed in the lower cover hole 130*a*. The mesh filter M allows the gas generated in the battery module 100 to pass as it is, but reduces the amount of flame discharged downward through the lower cover hole 130*a* and the speed of flame ejection. The first barrier 131 has a shape extending downward from the lower surface of the lower cover 130, and increases a movement path of the flame together with a second barrier 210, explained later, so that the flame may be extinguished inside the battery pack 1 without being leaked to the outside.

The supporting plate 200 is positioned under the plurality of battery modules 100 and provides a space into which the plurality of battery modules 100 may be inserted. The supporting plate 200 includes a plurality of second barriers 210 formed to extend upward (in a direction parallel to the Z axis in FIG. 11) and a gas discharge hole 200*a* formed at a center thereof in a longitudinal direction (a direction parallel to the X axis in FIG. 11).

Among the plurality of first barriers 131 and the plurality of second barriers 210, the first barrier 131 and the second barrier 210 formed at positions corresponding to each other intersect each other. Therefore, the flame introduced into the space between the lower cover 130 and the supporting plate 200 through the mesh filter M increases its movement path when it moves toward the gas discharge hole 200*a*, and accordingly, the flame may be extinguished without being discharged to the outside through the gas discharge hole 200*a*. That is, the supporting plate 200 serves as a component for fixing the battery module 100 and a component for giving a structure for extinguishing the flame simultaneously.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
   a pair of battery modules, each battery module comprising:
      a module housing;
      a first grip groove in a top of the module housing; and
      at least one connector formed at the top of the module housing;
   a supporting plate coupled to a bottom of the pair of battery modules and configured to be fixed to the ground; and
   a Battery Management System (BMS) assembly having a pair of guide protrusions, one of the pair of guide protrusions respectively inserted into the first grip groove of one of the pair of battery modules and the BMS coupled to the pair of battery modules by the connector.

2. The battery pack according to claim 1, wherein each battery module of the pair of battery modules includes:
a cell stack having a plurality of battery cells accommodated in the module housing;
a lower cover configured to cover a bottom opening of the module housing; and
an upper cover assembly configured to cover a top opening of the module housing.

3. The battery pack according to claim 2, wherein the upper cover assembly includes:
an upper cover configured to cover the top opening of the module housing so that the connector is formed at one longitudinal side thereof, the upper cover having an upper cover groove formed at a center of the upper cover to be concave downward;
a fuse fixed in the upper cover groove and electrically connected to the battery cell;
a fuse cover configured to cover the fuse inside the upper cover groove; and
a cover plate configured to cover a top of the upper cover groove and coupled to the upper cover.

4. The battery pack according to claim 3, wherein the cover plate has at least one pair of cover plate holes and is formed to be spaced apart from the fuse cover so that the first grip groove of each of the pair of battery modules is formed between the cover plate and the fuse cover.

5. The battery pack according to claim 4, wherein the BMS assembly includes:
a BMS body coupled to the pair of battery modules; and
a BMS cover coupled to an upper portion of the BMS body.

6. The battery pack according to claim 5, wherein the battery pack has second grip grooves formed between a longitudinal side of the BMS cover and a longitudinal side of the BMS body.

7. The battery pack according to claim 5, wherein the pair of guide protrusions are formed at a lower surface of the BMS body and inserted into the at first grip groove of each of the pair of battery modules through the cover plate hole to guide coupling between the BMS assembly and the battery module.

8. The battery pack according to claim 7, further comprising:
a gasket interposed between each of the pair of guide protrusions and an inner surface of the cover plate hole.

9. The battery pack according to claim 2, wherein a gas channel is formed between the cell stack and the module housing.

10. The battery pack according to claim 9, wherein the lower cover has lower cover holes formed at longitudinal sides thereof to communicate with the gas channel.

11. The battery pack according to claim 10, wherein a mesh filter is inserted into the lower cover holes.

12. The battery pack according to claim 11, wherein the lower cover includes a plurality of first barriers configured to extend downward.

13. The battery pack according to claim 12, wherein the supporting plate includes:
a plurality of second barriers formed to extend upward; and
a gas discharge hole formed at a longitudinal center thereof.

14. The battery pack according to claim 13, wherein the plurality of first barriers and the plurality of second barriers formed at positions corresponding to each other are configured to intersect each other.

15. The battery pack according to claim 2, wherein the plurality of battery cells are a plurality of pouch-type battery cells.

16. The battery pack according to claim 1, wherein the pair of guide protrusions are integrally formed with a bottom surface of the BMS assembly.

17. The battery pack according to claim 1, further comprising a plurality of pouch-type battery cells in each of the pair of battery modules.

* * * * *